United States Patent [19]
Naito et al.

[11] Patent Number: 5,365,131
[45] Date of Patent: Nov. 15, 1994

[54] LINEAR MOTOR PRIMARY

[75] Inventors: Yoshiaki Naito, Kawasaki; Keiichi Kohroki, Aichi; Masayuki Kawaguchi, Inazawa, all of Japan

[73] Assignee: Otis Elevator Company, Farmington, Conn.

[21] Appl. No.: 152,794

[22] Filed: Nov. 15, 1993

[30] Foreign Application Priority Data

Nov. 16, 1992 [JP] Japan .................. 4-078320[U]

[51] Int. Cl.⁵ .................................. H02K 41/02
[52] U.S. Cl. ............................. 310/12; 310/71
[58] Field of Search ................ 310/12, 14, 71; 336/192

[56] References Cited

U.S. PATENT DOCUMENTS 4,954,734  9/1990  Iguchi et al. ................ 310/71
5,017,818  5/1991  Dohogne ..................... 310/71
5,298,819  3/1994  Suganuma et al. ........... 310/12

Primary Examiner—Steven L. Stephan
Assistant Examiner—Judson H. Jones

[57] ABSTRACT

A linear motor primary driven by three phase electrical current is provided comprising a plurality of coils, each having a first and second lead, a plurality of laminations, and a plurality of "U" shaped conductive connectors, for electrically connecting the leads of the coils. The coils are arranged in poles, each pole having three phases, each phase having a like number of coils. The first and second leads of the coils of a particular phase are aligned in a first and second circumferential positions, thereby forming axial rows along the primary. Coils of a particular phase are connected by connecting leads in the same row with the "U" shaped conductive connectors.

12 Claims, 3 Drawing Sheets

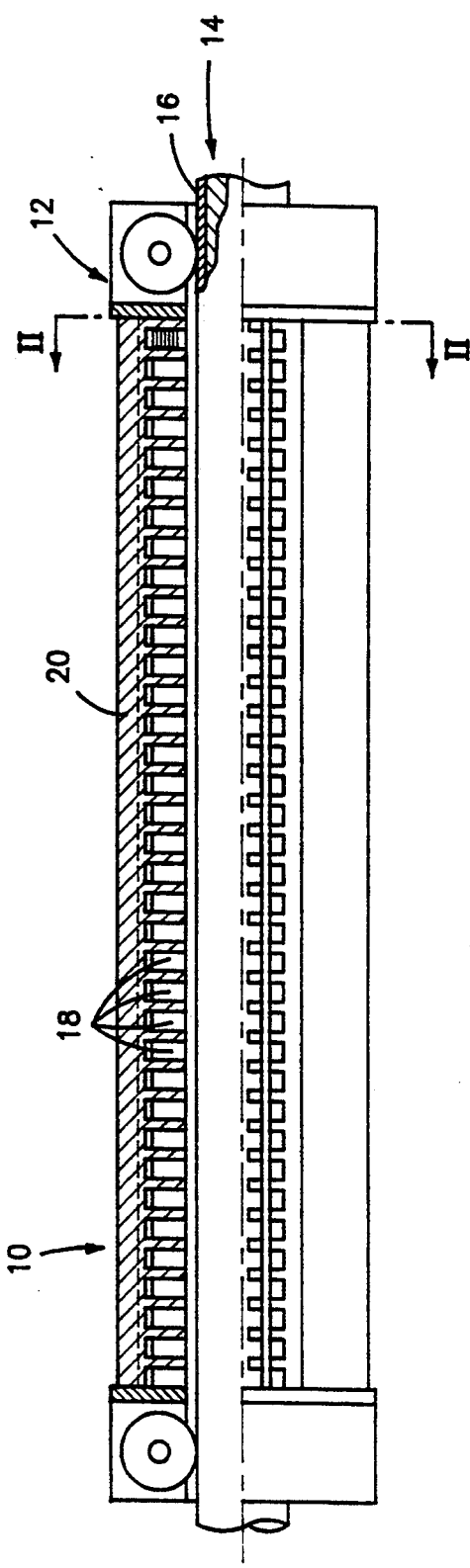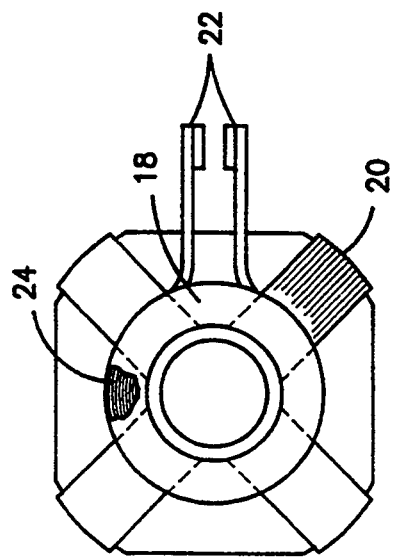

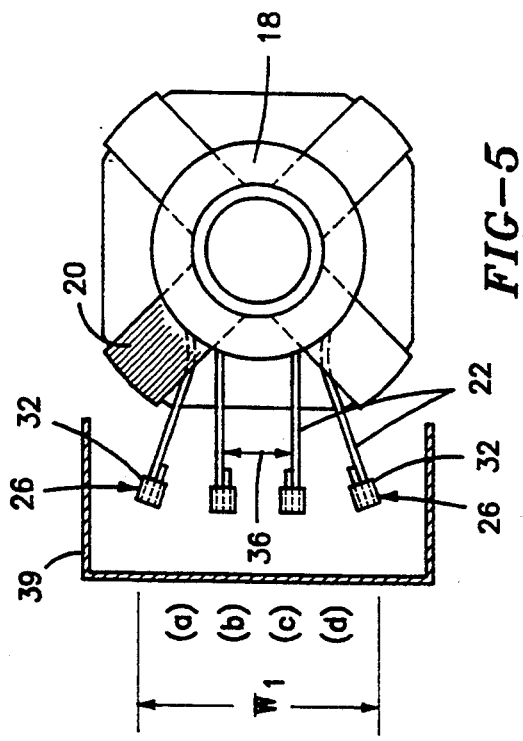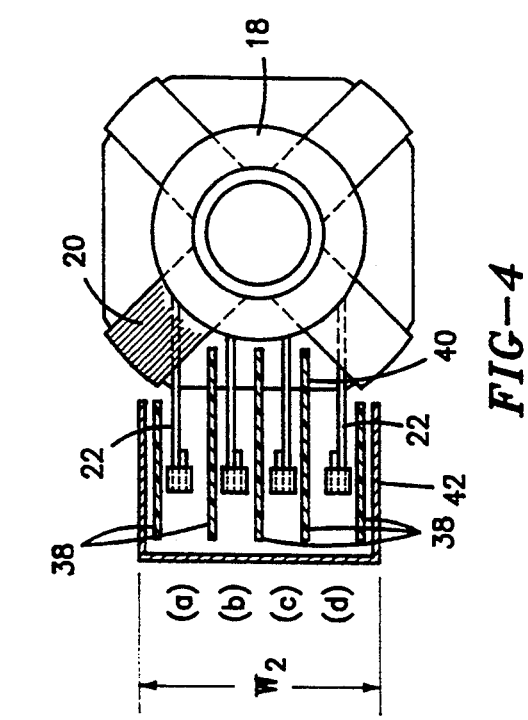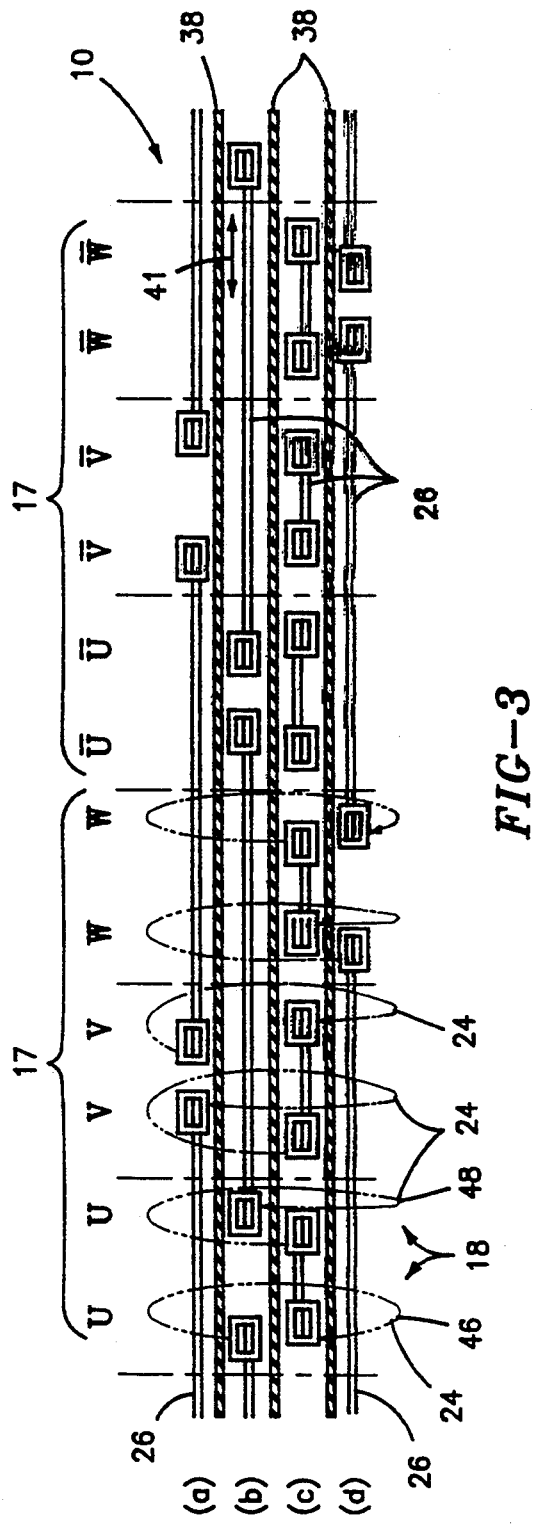

LINEAR MOTOR PRIMARY

BACKGROUND OF THE INVENTION

1. Technical Field

This invention relates to tubular linear motors, and more specifically to winding arrangements for tubular linear motor primaries.

2. Background Art

Tubular linear motors, or TLIM's, having a primary and a secondary, provide a means for linear propulsion. The secondary typically consists of a cylindrical body of ferromagnetic material having a surface covered by a layer of highly conductive material. The layer faces the primary, and is separated from the primary by an air gap.

The primary consists of a plurality of coils and thin ferromagnetic laminations. The laminations have a width and a length defined by a first and a second end. A series of notches are formed in the width of each lamination. When the laminations are aligned side by side, the notches collectively form channels which extend in a direction perpendicular to the length of the laminations. Each coil comprises a plurality of wires wrapped cylindrically into a disc shaped body having an inner and outer diameter. Each revolution of wire within the coil is referred to as a "winding". The windings of each coil begin with a first lead and end with a second lead, both of which extend outside of the coil for connection to other coils and\or to the power source. The coils are received within the channels.

The laminations may be arranged in a number of different configurations. One configuration uses four separate groups of laminations symmetrically arranged around the coils and cylindrical secondary. The coils are received within the aligned channels of the lamination groups. A pair of annular flanges, one on each end of the laminations, hold the lamination groups and the coils together. The secondary is free to move axially within the center of the coils.

The number of coils in the primary is directly related to the number of poles in the motor and the number of phases present in the current passed through the coils. For example, if the current used is three phase alternating current (AC current) and the motor is a two pole motor, the motor will have six coils. By convention, when using three phase AC current, the three phases of the current are designated "U" "V" and "W". In the aforementioned example, therefore, the coil arrangement can be described as UVW$\overline{U}$$\overline{V}$$\overline{W}$ (The bars over the latter three coils by convention designate current traveling in a direction opposite that in the first three coils). In a four pole motor, for example, the coil arrangement would be UVW$\overline{U}$$\overline{V}$$\overline{W}$UVW$\overline{U}$$\overline{V}$$\overline{W}$, and so forth. A person of skill in the art will recognize that each phase of each pole may comprise more than one pole; i.e. UUVVWW$\overline{U}$$\overline{U}$$\overline{V}$$\overline{V}$$\overline{W}$$\overline{W}$ describes a two pole, three phase AC current motor having two coils per phase, per pole.

It is known in the art that coil leads may be connected using connection plates that are bent in a complicated manner. There are several disadvantages to connecting coil leads in this conventional manner. One disadvantage is that the connection plate bending work must be done manually and even in the simplest of TLIM's, this task is time consuming and complicated. In TLIM's having a plurality of coils in each phase of each pole, the complexity of the task greatly increases and therefore becomes quite arduous.

Another disadvantage of the conventional method of connecting the coil leads is that both ends of the connection plates need to be soldered to the lead sections. The soldered connections require that solder be applied to the lead sections and to the connection plates beforehand. A large amount of time is, therefore, consumed preapplying solder and subsequently soldering the plates and the leads together. In addition, as the coil temperature increases when the linear motor is operated for a long time and the solder nears the melting point temperature, the strength at the connection may decrease.

DISCLOSURE OF INVENTION

It is an object of the invention to facilitate the assembly of the primary of a linear motor.

It is a further object of the present invention to improve the durability of the primary of a linear motor.

It is a still further object of the present invention to improve the uniformity of the primary of a linear motor.

It is a still further object of the present invention to provide a more compact primary of a linear motor.

According to the present invention, a linear motor primary driven by three phase electrical current is provided comprising a plurality of coils, each having a first and second lead, a plurality of laminations, and a plurality of "U" shaped conductive connectors, for electrically connecting the leads of the coils. The coils are arranged in poles, each pole having three phases, each phase having a like number of coils. The first and second leads of the coils of a particular phase are aligned in a first and second circumferential positions, thereby forming axial rows along the primary. The coils of a particular phases are connected by connecting the leads in the same row with the "U" shaped conductive connectors.

According to one aspect of the present invention, the "U" shaped conductive connectors comprise a first and second leg, each having a collar attached thereto. The coil leads are received within the collars, thereby electrically connecting the coils.

According to another aspect of the present invention, electrically insulative material is positioned between each of the rows formed by the aligned leads.

An advantage of the present is that the assembly of the linear motor primary is facilitated. The time consuming bending and soldering is eliminated.

A further advantage of the present invention is that the durability of the linear motor primary is increased. The solderless connections of the "U" shaped conductive connectors eliminates the solder used in conventional linear motor primaries which can thermally degrade.

A still further advantage of the present invention is that the uniformity of the linear motor primary is increased. The "U" shaped connectors eliminate the manual bending and the soldering necessary in conventional linear motor primaries, and thereby eliminate the inconsistencies associated therewith.

A still further advantage of the present invention is that the compactness of the linear motor primary is increased. Arranging the leads into discrete rows and placing electrically insulative therebetween decreases the space necessary for connectors.

These and other objects, features, and advantages of the present invention will become more apparent in light of the following detailed description of a best mode embodiment thereof, as illustrated in the accompanying drawing.

BRIEF DESCRIPTION OF THE DRAWINGS

FIG. 1 is a diagrammatic view of a linear motor showing the primary partially sectioned.

FIG. 2 is a cross-sectional view of the linear motor shown in FIG. 1, without the axial section removed.

FIG. 3 is a diagrammatic view of the connectors and the coil leads aligned in rows.

FIG. 4 is the same cross-section as shown in FIG. 2, including the present invention.

FIG. 5 is the cross-section shown in FIG. 4, without the insulative material between rows.

BEST MODE FOR CARRYING OUT THE INVENTION

Figure 6:
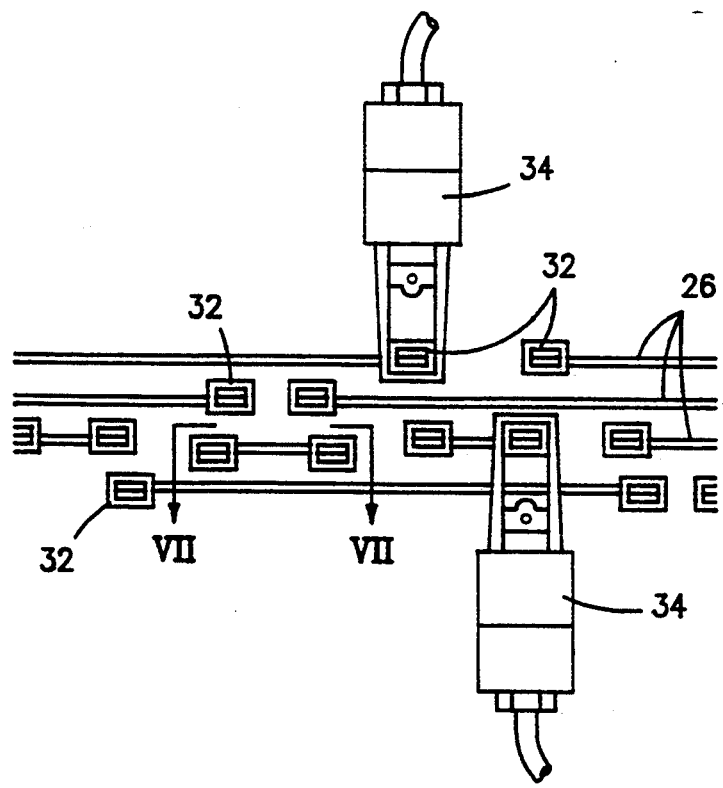
FIG. 6 is the explanatory illustration of crimping operation.

Referring to FIGS. 1 and 2, a tubular linear motor 10, or TLIM, is shown having a primary 12 and a secondary 14, as is known in the art. The secondary 14 consists of a cylindrical body of ferromagnetic material having a surface covered by a highly conductive material 16. The primary 12 consists of a plurality of coils 18 and thin ferromagnetic laminations 20. Each coil 18 comprises a plurality of windings 24 beginning with one lead 22 and ending with another lead 22. The leads 22 extend out from each coil 18 for attachment to the current source (not shown) either directly or indirectly through other coils 18.

Referring to FIG. 3, a two pole 17 motor 10 powered by three phase AC current is diagrammatically shown. The coils 18 of the U-phase, V-phase and W-phase are repeatedly arranged in order from the left and two coils 18 are provided for each phase. By conventional, the coil 18 arrangement is described as UUVVWW$\overline{U}$-$\overline{UVVWW}$. Each coil 18 is diagrammatically represented as having a single winding 24, shown in FIG. 3 as a two-dash line.

Referring to FIGS. 3 and 4, the leads 22 of each coil 18 in any particular phase are aligned in two circumferential positions; i.e. one lead 22 of each phase coil 18 is aligned in a first row, and the other lead 22 is aligned in a second row. The coil leads 22 for all three phases are aligned in a similar manner. In the preferred embodiment, four rows accommodate the leads 22 from all three phases. The leads can be seen in rows designated (a)–(d) in FIGS. 3–5, extending in the axial direction. Rows (b) and (c), rows (a) and (c), and rows (c) and (d) accommodate the U-phase, V-phase, and W-phase leads 22, respectively.

Figure 7:
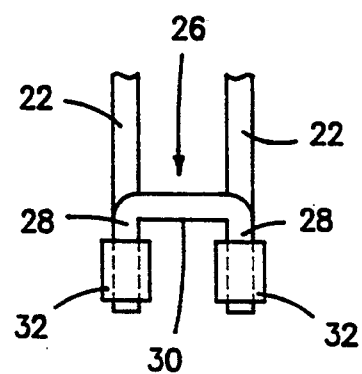
FIG. 7 is a sectional view of the operation shown in FIG. 6.

Referring to FIGS. 6 and 7, "U" shaped electrically conductive connectors 26 are used to connect the leads 22 in the above described manner. The "U" shape is defined as two legs 28 connected by a midsection 30 (see FIG. 7). The midsection 30 length is dictated by the distance between the coil leads 22 to be joined. The connectors 26 connecting adjacent coils (see FIG. 3) in a particular phase, in a particular pole 17, therefore, have a shorter midsection 30 than the connectors 26 extending between like phases in adjacent poles 17 (see FIG. 3). Each leg 28 includes a collar 32 for receiving the lead 22 to be connected. In the preferred embodiment, the leads 22 are fixed to the connector legs 28 by mechanically crimping the collars 32 using a crimping tool 34, as is shown in FIG. 6.

Referring to FIG. 5, in a first embodiment the leads 22 and the connectors 26 aligned in axial rows are spaced apart a specific minimum distance 36 to avoid undesirable interference and possible electrical shorting. A terminal box 39 having a width "$W_1$" protects the leads 22 and connectors 26 from the environment around the primary 12.

Referring to FIG. 4, in a second embodiment sheets of electrically insulative material 38 are positioned between the rows of connectors 26 and leads 22, thereby separating the phases. The sheets 38 have a rectangular cross-section 40 and a length 41 (see FIG. 3), the latter extending in a direction parallel to the axial rows. A terminal box 42 having a width "$W_2$" protects the leads 22 and connectors 26 from the environment around the primary 12. The terminal box 42 may be formed with an electrically insulative material. Alternatively, sheets 38 of insulative material are included between the leads 22 and the terminal box 42.

An advantage of the insulative sheets 38, is that the rows can be arranged in a compact fashion, separated by the insulative sheets 38. The overall dimension of the terminal box 42 is less than it would be without insulation; i.e. $W_2 > W_1$. Another advantage of the insulative sheets 38 is that the rows can be assembled in a more uniform manner, using the sheets 38 to separate the rows.

Referring to FIG. 3, in the two coil 18, two pole 17 motor 10 example used for illustrative purposes in this best mode, one lead 22 of each coil 18 in each phase, is connected outside of that phase either to a coil 18 of like phase in an adjacent pole 17, or to the power source (not shown) at the ends of the primary 12 via connectors 26. The other leads 22 of the two coils 18 in the phase are connected together via a connector 26. In other words, in the left "U" phase in the two pole motor 10 shown in FIG. 3, one lead 22 in the left coil 46 is connected to the power source (not shown). The other lead 22 extending out from the left coil 46 is attached to a lead 22 extending out from the right coil 48. The second lead 22 extending out from the right coil 48 is attached to a coil 22 in the "U" phase in the right adjacent pole 17. All of the above described connections are made using connectors 26. A person of skill in the art will recognize that the "V" and "W" phase coil 18 connections may be described similarly.

Although the invention has been shown and described with respect to a best mode embodiment thereof, it should be understood by those skilled in the art that various other changes, omissions and additions in the form and detail thereof may be made therein without departing from the spirit and scope of the invention.

We claim:

1. A linear motor primary driven by three phase electrical current, comprising:
    a plurality of coils, having a first and second lead;
    a plurality of laminations; and
    a plurality of "U" shaped conductive connectors, for electrically connecting said leads of said coils;
    wherein said plurality of coils are arranged in poles, each pole having three phases, each phase having a like number of coils; and
    wherein said first leads of said coils of a particular phase are aligned in a first circumferential position and said second leads of said coils are aligned in a second circumferential position, said leads thereby forming axial rows along said primary; and wherein said coils of a particular phase are connected by connecting said leads in said same row with said "U" shaped conductive connectors.

2. A linear motor primary according to claim 1, wherein said "U" shaped conductive connectors comprise:

a first leg, having a collar attached thereto; and a second leg, having a collar attached thereto;

wherein said leads of said coils are received within said collars, thereby electrically connecting said coils.

3. A linear motor primary according to claim 2, wherein said collars may be crimped to fix said leads to said legs of said "U" shaped conductive connectors.

4. A linear motor primary according to claim 1, wherein said primary further comprises electrically insulative material between each of said rows.

5. A linear motor primary according to claim 4, wherein said electrically insulative material has a flat plate shaped geometry.

6. A linear motor primary according to claim 2, wherein said primary further comprises electrically insulative material between each of said rows.

7. A linear motor primary according to claim 6, wherein said electrically insulative material has a flat plate shaped geometry.

8. A tubular linear motor primary driven by three phase electrical current, comprising:

a plurality of coils, having a first and second lead;

a plurality of laminations; and a plurality of "U" shaped conductive connectors, for electrically connecting said leads;

wherein said plurality of coils are arranged in poles, each pole having three phases, each phase having a like number of coils; and-wherein said first leads of said coils of a particular phase are aligned in a first circumferential position and said second leads of said coils are aligned in a second circumferential position, said leads thereby forming axial rows along said primary; and wherein said coils of a particular phases are connected by connecting said leads in said same row with said "U" shaped conductive connectors.

9. A tubular linear motor primary according to claim 8, wherein said "U" shaped conductive connectors comprise:

a first leg, having a collar attached thereto; and a second leg, having a collar attached thereto;

wherein said leads of said coils are received within said collars, thereby electrically connecting said coils.

10. A tubular linear motor primary according to claim 9, wherein said collars may be crimped to fix said leads to said legs of said "U" shaped conductive connectors.

11. A linear motor primary according to claim 9, wherein said primary further comprises electrically insulative material between each of said rows.

12. A linear motor primary according to claim 11, wherein said electrically insulative material has a flat plate shaped geometry.

* * * * *